United States Patent
Gallagher et al.

(12)

(10) Patent No.: US 8,453,232 B1
(45) Date of Patent: May 28, 2013

(54) VIRTUAL SMART CARD THROUGH A PC/SC INTERFACE

(75) Inventors: Gregory R. Gallagher, Newton, MA (US); Bruce F. Emmert, Arlington, MA (US); Christopher W. Duane, Billerica, MA (US); Chen Ho, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 238 days.

(21) Appl. No.: 12/894,502

(22) Filed: Sep. 30, 2010

(51) Int. Cl.
*G06F 21/00* (2006.01)

(52) U.S. Cl.
USPC .............................. 726/20; 713/189

(58) Field of Classification Search
USPC ............................. 713/189; 726/20
See application file for complete search history.

(56) References Cited

U.S. PATENT DOCUMENTS

| 5,887,065 | A | 3/1999 | Audebert |
| 5,937,068 | A | 8/1999 | Audebert |
| 6,351,813 | B1* | 2/2002 | Mooney et al. ............... 713/185 |
| 7,364,087 | B2* | 4/2008 | Zimmer et al. ............... 235/492 |
| 2003/0212894 | A1* | 11/2003 | Buck et al. .................... 713/184 |
| 2006/0050885 | A1* | 3/2006 | Camus et al. ................. 380/255 |
| 2008/0041931 | A1* | 2/2008 | Lu et al. ........................ 235/375 |
| 2008/0209574 | A1* | 8/2008 | Parkinson et al. .............. 726/28 |
| 2009/0327587 | A1* | 12/2009 | Grebe et al. .................. 711/103 |

* cited by examiner

*Primary Examiner* — Michael Pyzocha
(74) *Attorney, Agent, or Firm* — BainwoodHuang

(57) ABSTRACT

A technique of providing a cryptographic service on a computer having a processor includes deploying an executable cryptographic agent set on the computer, each executable cryptographic agent from the executable cryptographic agent set being a set of instructions executed on the processor. The technique also includes activating an executable cryptographic agent on the computer, each executable cryptographic agent being constructed and arranged to generate cryptographic codes which change over time in response to activation of the agent. The technique further includes providing, to an application running on the computer, access to the executable cryptographic agent through a Personal Computer/Smart Card (PC/SC) interface of the computer.

20 Claims, 5 Drawing Sheets

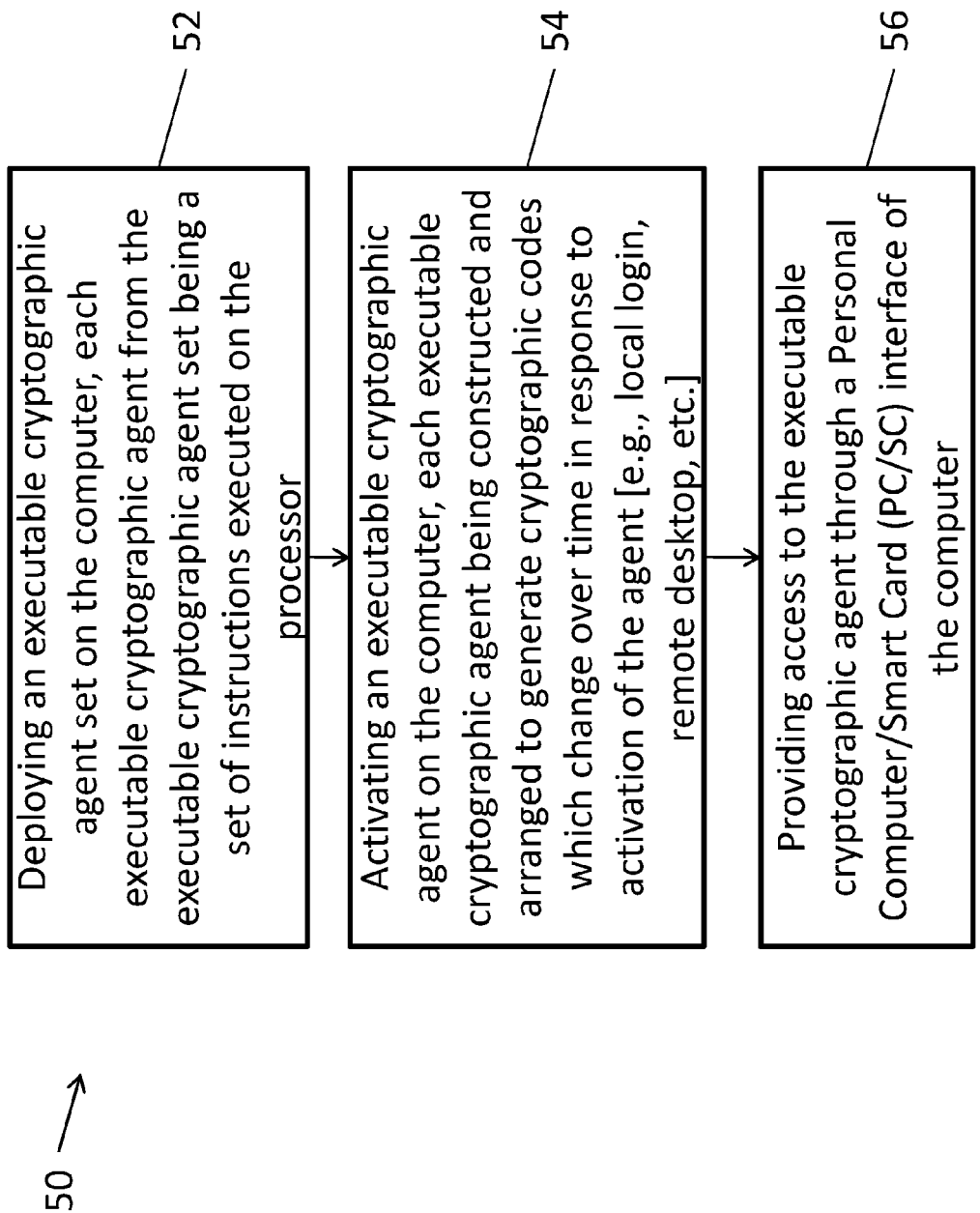

VIRTUAL SMART CARD THROUGH A PC/SC INTERFACE

BACKGROUND

A conventional authentication system includes a user authentication token, a user computer, and an authentication server which connects to the user computer over a network. For the user to authenticate to the authentication server, the user physically plugs the user authentication token into the user computer. One conventional user authentication token plugs into a USB port of the user computer.

After the authentication token is physically plugged into the user computer, the authentication token dynamically generates tokencodes such as a one-time passcode (OTP), and supplies the generated tokencode as well as a digital certificate to an application upon request via the Personal Computer/Smart Card (PC/SC) interface of the user computer.

Current software packages in the form of virtual smart cards are capable of providing OTPs and digital certificates for use by a certain set of specialized applications.

SUMMARY

Most applications, however, are not able to access virtual smart cards through the PC/SC interface even as they are able to access physical smart cards [i.e., hardware tokens] through the PC/SC interface. Special applications which have access to certain libraries [e.g., PKCS #11] are required to be used which recognize tokencodes and certificates generated by these programs. More generic applications running on, e.g., Microsoft Windows™ or Linux, are currently unable to take advantage of virtual smart cards.

In contrast to the above-described scenario in which a physical token is required for a generic application to access tokencodes generated by the token, this disclosure describes a technique for simulating a hardware token in software. This simulated or virtual token can be accessed through the PC/SC interface. As with a hardware token, the virtual token contains credentials that can be read by a smart card application that sits on top of a smart card stack with the PC/SC interface towards the bottom of the stack and the virtual smart card at the bottom of the stack. Besides housing credentials such as tokencodes and digital certificates, the virtual smart card can perform cryptographic operations that are normally performed within the smart card, such as key generation, encryption/decryption and signing.

Such a technique of providing a cryptographic service on a computer having a processor is presented as an embodiment of a method. The method includes deploying an executable cryptographic agent set on the computer, each executable cryptographic agent from the executable cryptographic agent set being a set of instructions executed on the processor. The method also includes activating an executable cryptographic agent on the computer, each executable cryptographic agent being constructed and arranged to generate cryptographic codes which change over time in response to activation of the agent. The method further includes providing, to an application running on the computer, access to the executable cryptographic agent through the PC/SC interface of the computer.

Implementations are directed to the following.

Providing access to the executable cryptographic agent can include locating, on a non-volatile memory coupled to the processor, a token seed value and generating, based on the token seed value, a set of one-time passcodes which act as a cryptographic code. Along this vein, deploying the executable cryptographic agent set on the computer can include providing a set of inquiries to a user, receiving a set of enrollment answers from the user in response to the set of inquiries, each enrollment answer from the set of enrollment answers corresponding to an inquiry from the set of inquiries and storing the sets of inquiries and enrollment answers on the non-volatile memory. In this case, the sets of inquiries and enrollment answers, in combination with a personal identification number, provide a vehicle for the user to be identified within the computer. Also, activating the executable cryptographic agent on the computer can include providing, from the non-volatile, computer-readable storage medium, the set of inquiries to a prospective user, receiving a set of answers from the prospective user in response to the set of inquiries and comparing the received set of answers to the stored set of enrollment answers. Further, providing the set of inquiries to the prospective user can include sending, via a network interface on the computer, a message to the prospective user, the message including the set of inquiries. In this case, the prospective user is connected to a network through a virtual desktop environment and the network interface is coupled to the network to which the prospective user is connected.

Providing access to the executable cryptographic agent can include making available to the application a digital certificate from the executable cryptographic agent through the PC/SC interface. In this case, the digital certificate is constructed and arranged to identify the user to a third party.

Providing access to the executable cryptographic agent can include making available to the application a public key from the executable cryptographic agent through the PC/SC interface and providing encryption services for messages generated and sent to third parties by the application. In this case, the public key is constructed and arranged to match a private key from a third party.

Providing access to the executable cryptographic agent can include making available to the application a private key from the executable cryptographic agent through the PC/SC interface and providing decryption services for messages generated and sent from third parties to the user via the application. In this case, the private key is constructed and arranged to match public keys contained in the messages.

The technique can further include activating a second executable cryptographic agent from the executable cryptographic agent set on the computer and providing, to a second application running on the computer, access to the second executable cryptographic agent through the Personal Computer/Smart Card (PC/SC) interface of the computer.

A further embodiment to the technique of is an apparatus configured to provide a cryptographic service. The apparatus includes a memory. The apparatus further includes a processor coupled to the memory. The processor is configured to deploy an executable cryptographic agent set on the apparatus, each executable cryptographic agent from the executable cryptographic agent set being a set of instructions executed on the processor. The processor is also configured to activate an executable cryptographic agent on the apparatus, each executable cryptographic agent being constructed and arranged to generate cryptographic codes which change over time in response to activation. The processor is further configured to provide, to an application running on the apparatus, access to the executable cryptographic agent through a Personal Computer/Smart Card (PC/SC) interface of the apparatus.

Implementations are directed to the following.

The memory can be configured to store a token seed value. In this case, activating the executable cryptographic agent on the apparatus includes locating the token seed value on the memory and generating, based on the token seed value, a set of one-time passcodes which act as a cryptographic code.

Further, the apparatus can further include an input/output interface. In this case, deploying the executable cryptographic agent set on the apparatus includes providing a set of inquiries to a user via the input/output interface, receiving, via the input/output interface, a set of enrollment answers from the user in response to the set of inquiries, each enrollment answer from the set of enrollment answers corresponding to an inquiry from the set of inquiries and storing the sets of inquiries and enrollment answers on the memory. The sets of inquiries and enrollment answers, in combination with a personal identification number, can provide a vehicle for the user to be identified within the apparatus.

Activating the executable cryptographic agent can include providing, from the memory, the set of inquiries to a prospective user via the input/output interface, receiving, via the input/output interface, a set of answers from the prospective user in response to the set of inquiries and comparing the received set of answers to the stored set of enrollment answers.

The apparatus can further include a network interface. In this case, providing the set of inquiries to the prospective user can include sending, via the network interface, a message to the prospective user, the message including the set of inquiries. Further, the prospective user can be connected to a network through a virtual desktop environment and the network interface can be coupled to the network to which the prospective user is connected.

The processor can be further configured to activate a second executable cryptographic agent from the executable cryptographic agent set on the apparatus and provide, to a second application running on the processor, access to the second executable cryptographic agent through the PC/SC interface.

A further embodiment to the technique of is a computer program product having a non-transitory computer readable storage medium which stores code to provide a cryptographic service on a computer. The code includes instructions to deploy an executable cryptographic agent set on the computer, each executable cryptographic agent from the executable cryptographic agent set being a set of instructions executed on the processor. The code also includes instructions to activate an executable cryptographic agent on the computer, each executable cryptographic agent being constructed and arranged to generate cryptographic codes which change over time in response to activation. The code further includes instructions to provide, to an application running on the computer, access to the executable cryptographic agent through the PC/SC interface of the computer.

Implementations are directed to the following.

Activating the executable cryptographic agent on the computer can include locating, on a memory coupled to the processor, a token seed value and generating, based on the token seed value, a set of one-time passwords which act as a cryptographic code.

Deploying the executable cryptographic agent set on the computer can include providing a set of inquiries to a user, receiving a set of enrollment answers from the user in response to the set of inquiries, each enrollment answer from the set of enrollment answers corresponding to an inquiry from the set of inquiries, and storing the sets of inquiries and enrollment answers on the memory. In this case, the sets of inquiries and enrollment answers, in combination with a personal identification number, provide a vehicle for the user to be identified within the computer.

Activating the executable cryptographic agent on the computer can include providing, from the memory, the set of inquiries to a prospective user, receiving a set of answers from the prospective user in response to the set of inquiries and comparing the received set of answers to the stored set of enrollment answers.

The code can further include instructions to activate a second executable cryptographic agent from the executable cryptographic agent set on the computer and provide, to a second application running on the computer, access to the second executable cryptographic agent through the PC/SC interface.

Providing access to the executable cryptographic agent through the PC/SC interface of the computer can include deploying a windowing module in a software layer above that of the PC/SC interface and providing a subset of data input to and output from the PC/SC interface to a log file stored on the memory. In this case, the windowing module is a dynamically linked library configured to provide an application programming interface for a PKCS 11 unit test module to access the cryptographic agent.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 5 is a flow diagram of a method of providing a cryptographic service on a computer.

DETAILED DESCRIPTION

An improved technique of providing a cryptographic service on a computer includes providing, to an application running on the computer, access to an executable cryptographic agent through a Personal Computer/Smart Card (PC/SC) interface of the computer. The application is generally configured to run in an operating system on the computer. Providing access to the executable cryptographic agent can include sending a digital certificate or a public or private key to the application. In this way, the application offers two-level security to standard PC applications while alleviating the need for a physical smart card device.

Figure 1:
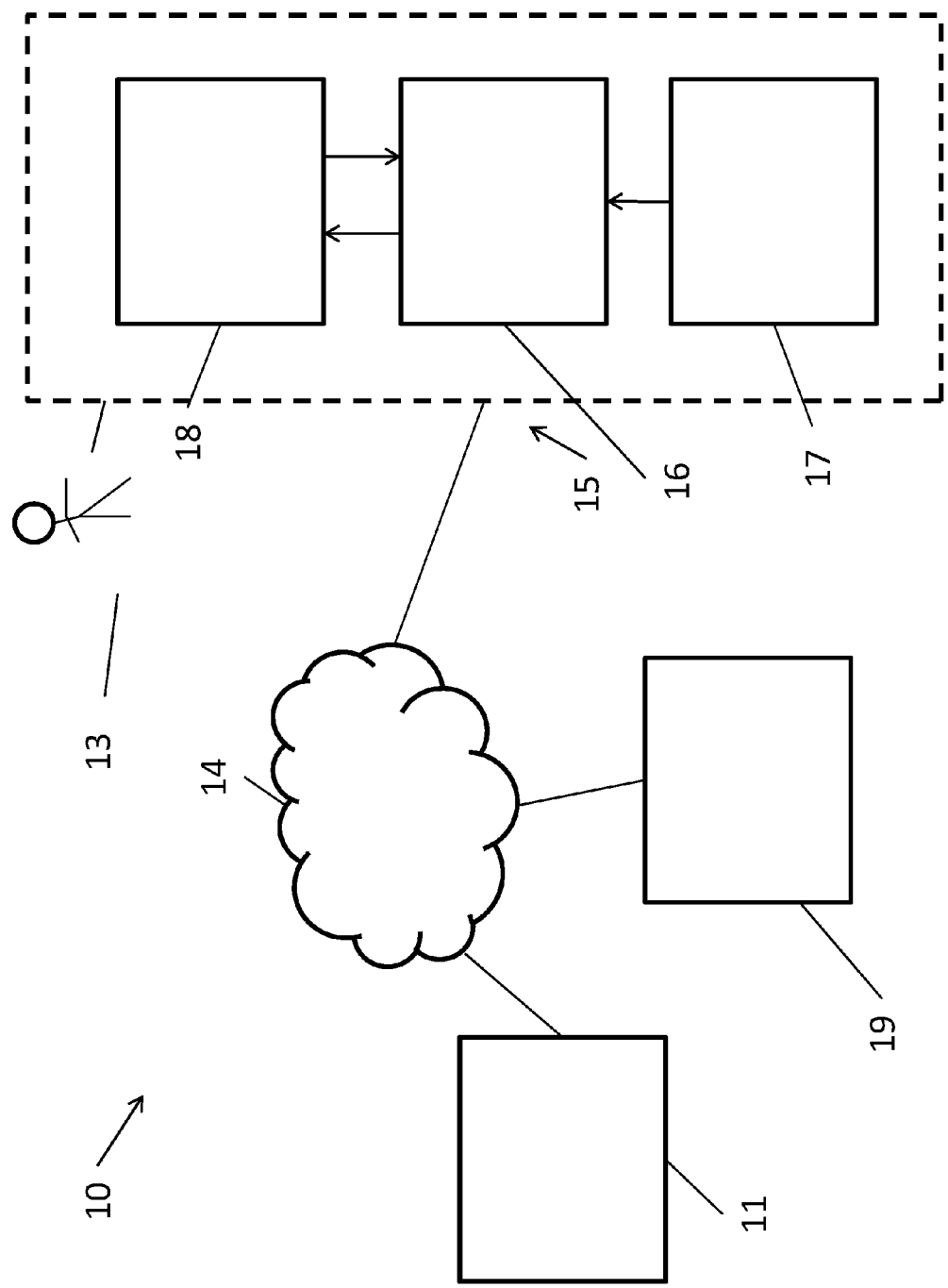
FIG. 1 is a block diagram of a system configured to provide a cryptographic service on a computer.

FIG. 1 shows a system 10 which is suitable for use by the improved technique by a user 13. System 10 includes computer 15, remote server 19, authentication server 11, and communications medium 14 between computer 15, authentication server 11 and remote server 19.

Communications medium 14 can include a public network [e.g., the Internet]. Further, communications medium 14 can include a firewall between the general public and computer 15 to limit access to authorized users of computer 15. In some circumstances, communications medium 15 can also include secure channels between nodes such as remote server 19 and computer 15.

Authentication server 11 includes a system configured to determine the veracity of a one-time password supplied by a system using communications medium 14.

Remote server 19 includes a computer system hosting an application run by a third party.

Computer 15 is configured to run application 17, which requires cryptographic codes verified by authentication server 11 in order to identify user 13 to a third party on remote server 19. To this effect, computer 15 runs a cryptographic agent 18 which generates the cryptographic codes used by application 17. Cryptographic codes commonly take the form of tokencodes, e.g., one-time passcodes which are generated according to a mathematical algorithm at predetermined time intervals, e.g., one minute. Within this system, two-factor security [e.g., security involving a OTP and a user-supplied personal identification number] is achieved on standard applications without the use of a physical smart card device.

Figure 2:
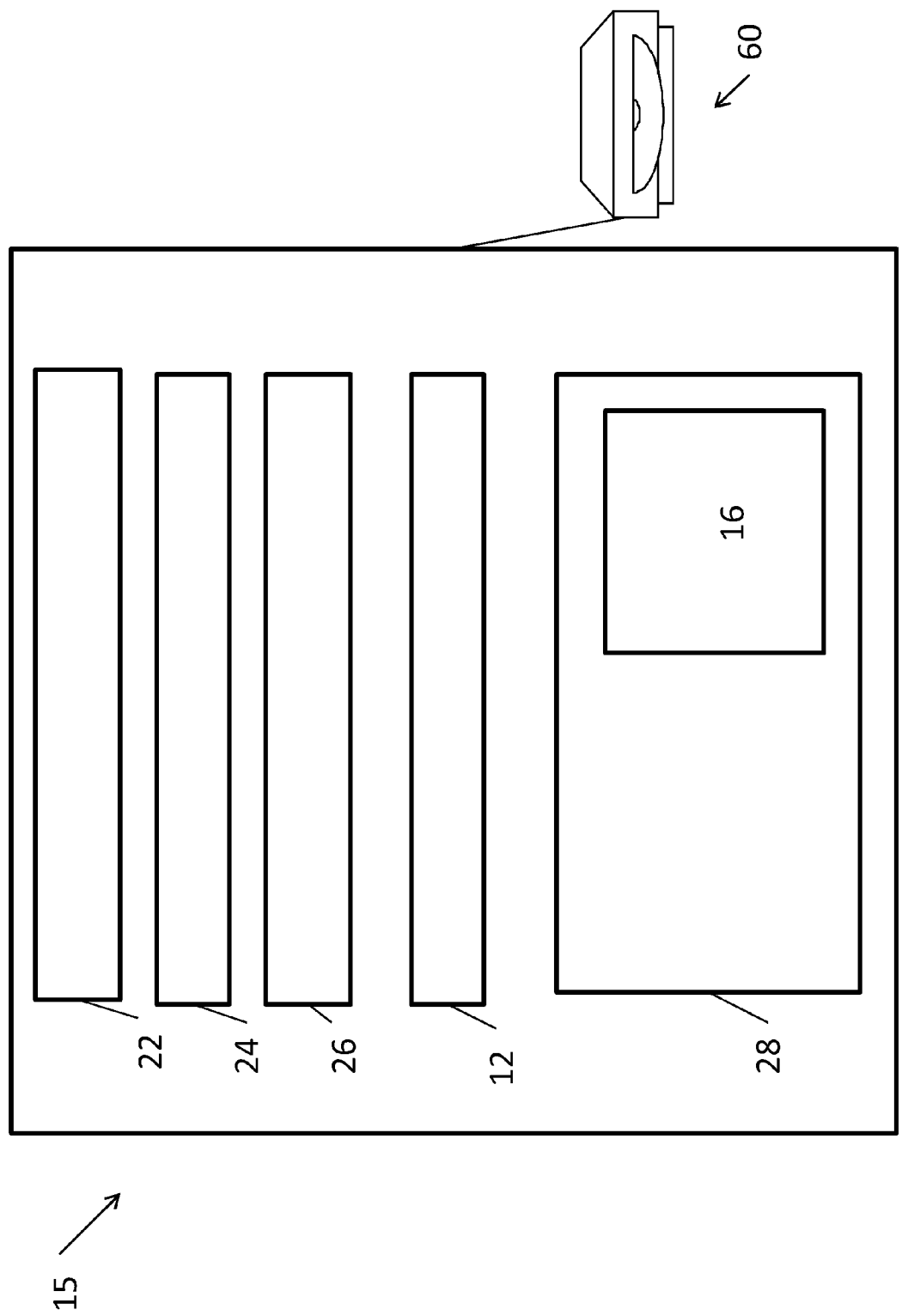
FIG. 2 is a block diagram of a computer.

FIG. 2 shows computer 15 in more detail. Computer 15 further includes an input/output device 12, processor 22, memory 24, network interface 26, and operating system 28.

Input/output device 12 includes a keyboard, mouse, and monitor, although other elements can include, but are not limited to a speech-to-text interpreter, a touch screen, a microphone, and speakers. Input/output device 12 converts thoughts and actions of user 13 into bit streams interpretable by computer 15.

Processor 22 is configured to run at least application 17 and cryptographic agent 18. Processor 22 can take the form of, but is not limited to, an Intel or AMD-based MPU, and can be a single or multi-core running single or multiple threads.

Memory 24, coupled to processor 22, is configured to store executables and data associated with application 17 and cryptographic agent 18. Further, cryptographic data such a token seed value used to generate cryptographic codes is also stored on memory 24.

Network interface 26, also coupled to processor 22, is connected to communications medium 15. Network interface 26 is further operable to enable user 13 to log in to computer 15 from a remote location. Network interface 26 can take the form of, but is not restricted to, an Ethernet card, an 802.11a/b/g/n wireless receiver/transmitter, a dial-up modem, or a Token Ring LAN.

Operating system 28 is stored in memory 24 and runs on processor 22. Operating system 28 preferably includes PC/SC interface 16 through which cryptographic agent 18 takes in requests from application 17 for cryptographic codes and gives out the cryptographic codes to application 17. For example, PC/SC interface 16 is a service embedded within operating system 28. Specifically, PC/SC interface 16 is a standard operating-system-level service which runs in Microsoft Windows™ and Linux and works with applications which run in such operating systems.

During operation, user 13 deploys cryptographic agent 18 onto computer 15 via input/output device 12. The deploying involves user 13 establishing an identity within computer 15 that is stored in memory 24. Once the identity is established, user 13 may log into computer 15 as the need arises. A subsequent, successful login by user 13 will activate cryptographic agent 18 in processor 22.

Figure 3:
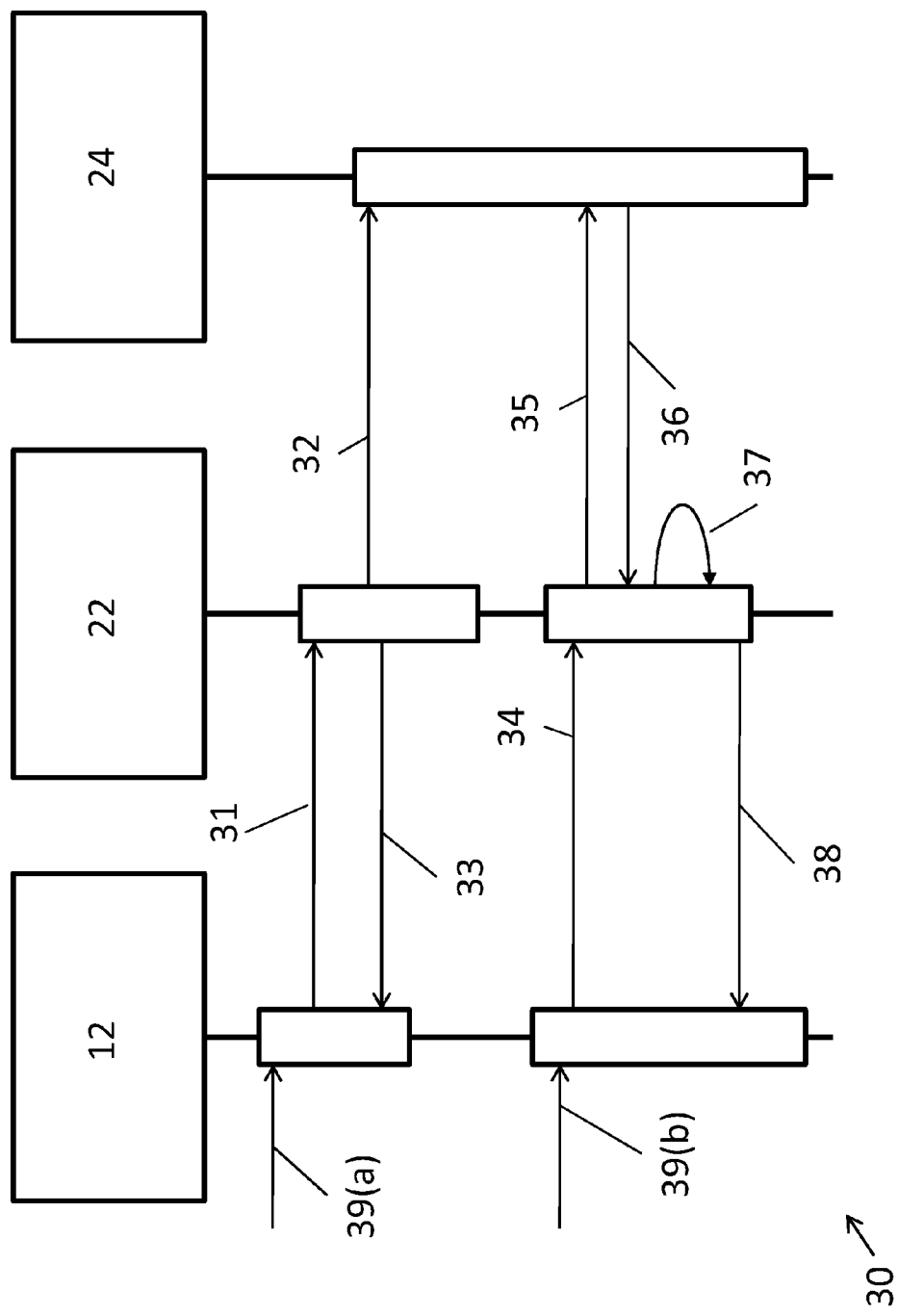
FIG. 3 is a sequence diagram of a deployment and activation of the cryptographic service.

FIG. 3 illustrates through a sequence diagram a deployment and activation process 30. User 13 sends a signal 39(a) to input/output interface 12 containing answers to life questions displayed on input/output interface 12 in an enrollment phase. Input/output interface 12 then sends a signal 31 to processor 22 to store the enrollment answers to the life questions in memory 24 as well as digital certificate and public/private key information from a physical token. Processor 22 then sends a signal 32 to memory 24 containing the enrollment answers to be stored on a location in memory 24. Processor 33 can then send a signal 33 to input/output interface 12 containing an acknowledgement that the enrollment answers have been stored on memory 24, thus establishing an identifier for user 13 on computer 15.

To activate some time later, user 13 sends a signal 39(b) to input/output interface 12 containing answers to life questions displayed on input/output interface 12. Input/output interface 12 then sends a signal 34 to processor 22 containing the answers. Processor 22 sends a signal 35 to memory 24 requesting the enrollment answers previously stored, upon the retrieval of which memory 24 sends a signal 36 back to processor 22 containing the enrollment answers. Processor 22 performs a comparison 37 the answers input at input/output interface 12 to the enrollment answers. Processor 22 then sends a signal 38 to input/output interface 12 containing results of the comparison 37. If comparison 37 is successful, then cryptographic agent 18 is activated and user 13 is logged in.

User 13 preferably sends the signal to input/output interface 12 from a location local to computer 15. Alternatively, user 13 can be connected to a network through a virtual desktop environment, where network interface 26 is coupled to the network to which the prospective user is connected. That is, user 13 logs in remotely to computer 15. A remote desktop environment in which user 13 works is, e.g., Remote Desktop, Citrix, etc.

Once logged in, user 13 may activate application 17 which requires cryptographic data assuring a third party of the identity of user 13. For example, user 13 can attach a digital certificate into an email to be sent using application 17. Alternatively, user 13 can obtain a public key to be sent in an encrypted email using application 17. Still further, user 13 can obtain a private key to be used in decrypting an email containing a public key from a third party, the decryption being performed by application 17. Such digital certificates and public and private keys are housed within cryptographic agent 18 and provide assurance to a third party of the identity of user 13 as well as authentication data to the third party.

Figure 4:
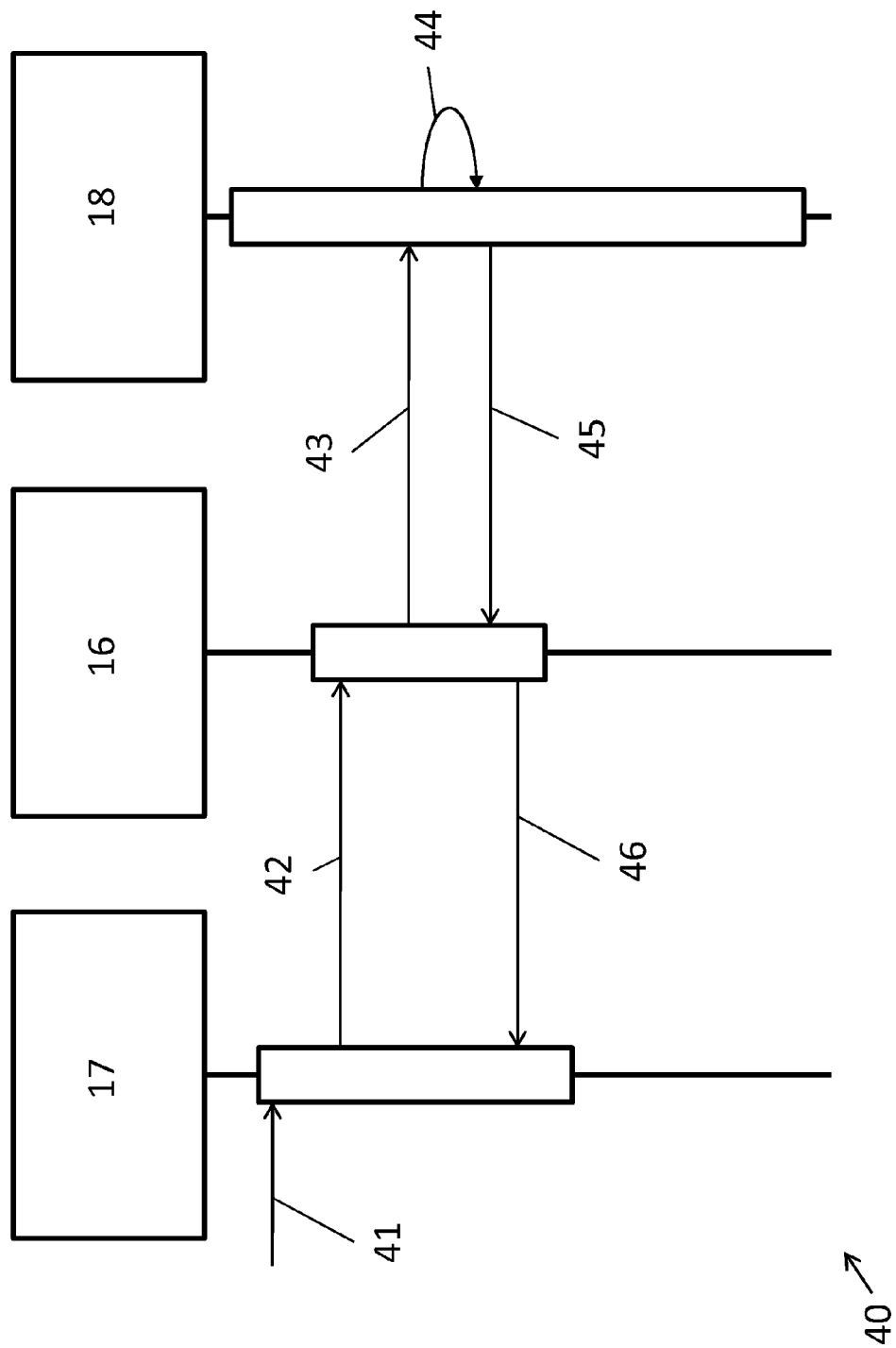
FIG. 4 is a sequence diagram of a providing of access of the cryptographic agent to an application.

FIG. 4 illustrates through a sequence diagram a process 40 of providing of cryptographic data such as one-time passcodes generated by a cryptographic agent 18 to an application 17 running on processor 22. User 13 through input/output interface 12 sends a signal 41 to application 17 to perform a function that requires computer 15 to vouch for the identity of user 13.

Application 17, upon being requested to perform the cryptographic function, sends a signal 42 to PC/SC interface 16 requesting cryptographic data. PC/SC interface 16 then sends a signal 43 to cryptographic agent 18 requesting cryptographic data.

Cryptographic agent 18, upon receiving the request 42 for cryptographic data, performs a generation 44 of a tokencode, e.g., a one-time passcode. The generation 44 is accomplished by accessing, in memory 24, a token seed value which, when combined with other parameters, e.g., system time, produces a one-time passcode valid for a predetermined time interval [e.g., one minute].

Once the one-time password is generated, cryptographic agent 18 sends a signal 45 to PC/SC interface 16 indicating the one-time passcode is available. Upon obtaining the one-time passcode, PC/SC interface 16 sends a signal 46 to application 17 including a message that the one-time passcode is available to be accessed from PC/SC interface 16.

Application 17 can perform cryptographic functions using the passcode and/or the public and private keys. For example, application 17 can access a private key housed in cryptographic agent 18 for decrypting an email message containing a public key generated using a compatible one-time passcode. Further, application 17 can access a public key housed in cryptographic agent 18 to be sent with an encrypted message; the encrypted message would then be decrypted by a third party.

Note that, with the system 10 described above, application 17 is ignorant of the origin of the cryptographic data it uses. That is, application 17 makes no differentiation between data retrieved from a physical smart card or a virtual smart card in the form of cryptographic agent 18. This ignorance of the data's origin on part of application 17 is possible because the application gets the data from PC/SC interface 16. In turn, PC/SC interface 16 is configured to obtain smart card data from various sources. Cryptographic agent 18 is configured to generate cryptographic data in a form recognizable to PC/SC interface 16 in order to be useful to application 17.

A further advantage of system 10 lies in its usefulness beyond a single cryptographic agent 18. For example, two cryptographic agents may be deployed for either multiple users and/or multiple applications. Each cryptographic agent generates cryptographic data independently and occupies different address spaces in memory 24 so that PC/SC interface 16 has a way of recognizing the origin and destination of each cryptographic datum sent to it.

System 10 as described above can be used for a backup authentication system for users who lose or forget their physical smart cards which generate one-time passcodes. Users can activate cryptographic agent 18 as needed once deployed in the presence of a trusted agent, e.g., a system admin. Further, the user can deactivate cryptographic agent 18 by shutting down computer 15 or logging off.

Alternatively, system 10 can be used as a testing platform. In this case, cryptographic agent 18 acts as a smart card simulation agent in which targeted smart card data that is used on a variety of smart card systems is generated by cryptographic agent 18. Further, system 10 also includes a virtual smart card API 19 which is placed on top of PC/SC interface 16. Virtual smart card API 19 takes the form of a dynamically linked library configured to provide an API for a PKCS 11 unit test module to access cryptographic agent 18. Virtual smart card API 19 acts as a windowing module in a software layer above PC/SC interface 16 and is deployed through an execution of an API call. Virtual smart card API 19, once deployed, provides the targeted data that passes to and from PC/SC interface 16 to a log file on memory 24 for inspection by system testers.

FIG. 5 illustrates a method of providing a cryptographic service on a computer having a processor. In step 52, an executable cryptographic agent set is deployed on the computer, each executable cryptographic agent from the executable cryptographic agent set being a set of instructions executed on the processor. In step 54, an executable cryptographic agent is activated on the computer, each executable cryptographic agent being constructed and arranged to generate cryptographic codes which change over time in response to activation of the agent. In step 56, access to the executable cryptographic agent is provided through a Personal Computer/Smart Card (PC/SC) interface of the computer.

The executable cryptographic agent set deployed in step 52 can be a single cryptographic agent or multiple agents. In the case of multiple agents, each agent is associated with a unique user and/or an application running on the processor [or multiple processors].

The cryptographic codes which change over time generated by a cryptographic agent activated in step 54 can take the form of one-time passcodes. The one-time passcodes have a lifetime of, e.g., one minute.

The PC/SC interface which provides access to a cryptographic agent in step 56 is configured to recognize cryptographic data from both agents in software form and as physical smart cards.

While various embodiments of the invention have been particularly shown and described, it will be understood by those skilled in the art that various changes in form and details may be made therein without departing from the spirit and scope of the invention as defined by the appended claims.

For example, it should be understood that some embodiments are directed to an electronic environment which utilizes system 10 that provides a cryptographic service on a computer having a processor. Some embodiments are directed to system 10. Some embodiments are directed to a process of providing cryptographic service on a computer having a processor. Also, some embodiments are directed to a computer program product which enables computer logic to perform the providing of cryptographic service on a computer having a processor.

In some arrangements, system 10 is implemented by a set of processors or other types of control/processing circuitry running software. In such arrangements, the software instructions can be delivered to system 10 in the form of a computer program product (illustrated generally by a diskette icon 60 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A method of providing a cryptographic service on a computer having a processor, the method comprising:
    deploying an executable cryptographic agent set on the computer, each executable cryptographic agent from the executable cryptographic agent set being a set of instructions executed on the processor and being provided by a virtual smart card stored in the computer;
    activating an executable cryptographic agent on the computer, each executable cryptographic agent being constructed and arranged to generate cryptographic codes which change over time in response to activation of the agent; and
    providing, to an application running on the computer, access to the executable cryptographic agent through a Personal Computer/Smart Card (PC/SC) interface of the computer.

2. A method as in claim 1, wherein providing access to the executable cryptographic agent includes:
    locating, on a non-volatile memory coupled to the processor, a token seed value; and
    generating, based on the token seed value, a set of one-time passcodes which act as a cryptographic code.

3. A method as in claim 2, wherein deploying the executable cryptographic agent set on the computer includes:
    providing a set of inquiries to a user;
    receiving a set of enrollment answers from the user in response to the set of inquiries, each enrollment answer from the set of enrollment answers corresponding to an inquiry from the set of inquiries; and
    storing the sets of inquiries and enrollment answers on the non-volatile memory;

wherein the sets of inquiries and enrollment answers, in combination with a personal identification number, provide a vehicle for the user to be identified within the computer.

4. A method as in claim 3, wherein activating the executable cryptographic agent on the computer includes:
providing, from the non-volatile, computer-readable storage medium, the set of inquiries to a prospective user;
receiving a set of answers from the prospective user in response to the set of inquiries; and
comparing the received set of answers to the stored set of enrollment answers.

5. A method as in claim 4, wherein providing the set of inquiries to the prospective user includes:
sending, via a network interface on the computer, a message to the prospective user, the message including the set of inquiries;
wherein the prospective user is connected to a network through a virtual desktop environment; and
wherein the network interface is coupled to the network to which the prospective user is connected.

6. A method as in claim 3, wherein providing access to the executable cryptographic agent includes:
making available, to the application, a digital certificate from the executable cryptographic agent through the PC/SC interface;
wherein the digital certificate is constructed and arranged to identify the user to a third party.

7. A method as in claim 3, wherein providing access to the executable cryptographic agent includes:
making available, to the application, a public key from the executable cryptographic agent through the PC/SC interface; and
providing encryption services for messages generated and sent to a third party by the application;
wherein the public key is constructed and arranged to match a private key from the third party.

8. A method as in claim 3, wherein providing access to the executable cryptographic agent includes:
making available, to the application, a private key from the executable cryptographic agent through the PC/SC interface; and
providing decryption services for messages generated and sent from third parties to the user via the application;
wherein the private key is constructed and arranged to match public keys contained in the messages.

9. A method as in claim 1, further comprising:
activating a second executable cryptographic agent from the executable cryptographic agent set on the computer; and
providing, to a second application running on the computer, access to the second executable cryptographic agent through the Personal Computer/Smart Card (PC/SC) interface of the computer.

10. An apparatus configured to provide a cryptographic service, the apparatus comprising:
a memory; and
a processor coupled to the memory, the processor configured to:
deploy an executable cryptographic agent set on the apparatus, each executable cryptographic agent from the executable cryptographic agent set being a set of instructions executed on the processor and being provided by a virtual smart card stored in the computer;
activate an executable cryptographic agent on the apparatus, each executable cryptographic agent being constructed and arranged to generate cryptographic codes which change over time in response to activation; and
provide, to an application running on the apparatus, access to the executable cryptographic agent through a Personal Computer/Smart Card (PC/SC) interface of the apparatus.

11. An apparatus as in claim 10, wherein the memory is configured to store a token seed value;
wherein activating the executable cryptographic agent on the apparatus includes:
locating the token seed value on the memory; and
generating, based on the token seed value, a set of one-time passcodes which act as a cryptographic code.

12. An apparatus as in claim 11, further comprising an input/output interface;
wherein deploying the executable cryptographic agent set on the apparatus includes:
providing a set of inquiries to a user via the input/output interface;
receiving, via the input/output interface, a set of enrollment answers from the user in response to the set of inquiries, each enrollment answer from the set of enrollment answers corresponding to an inquiry from the set of inquiries; and
storing the sets of inquiries and enrollment answers on the memory; and
wherein the sets of inquiries and enrollment answers, in combination with a personal identification number, provide a vehicle for the user to be identified within the apparatus.

13. An apparatus as in claim 12, wherein activating the executable cryptographic agent includes:
providing, from the memory, the set of inquiries to a prospective user via the input/output interface;
receiving, via the input/output interface, a set of answers from the prospective user in response to the set of inquiries; and
comparing the received set of answers to the stored set of enrollment answers.

14. An apparatus as in claim 13, further comprising a network interface;
wherein providing the set of inquiries to the prospective user includes:
sending, via the network interface, a message to the prospective user, the message including the set of inquiries;
wherein the prospective user is connected to a network through a virtual desktop environment; and
wherein the network interface is coupled to the network to which the prospective user is connected.

15. An apparatus as in claim 10, wherein the processor is further configured to:
activate a second executable cryptographic agent from the executable cryptographic agent set on the apparatus; and
provide, to a second application running on the processor, access to the second executable cryptographic agent through the PC/SC interface.

16. A computer program product having a non-transitory computer readable storage medium which stores code to provide a cryptographic service on a computer having a processor, the code including instructions to:
deploy an executable cryptographic agent set on the computer, each executable cryptographic agent from the executable cryptographic agent set being a set of instructions executed on the processor and being provided by a virtual smart card stored in the computer;

activate an executable cryptographic agent on the computer, each executable cryptographic agent being constructed and arranged to generate cryptographic codes which change over time in response to activation; and provide, to an application running on the computer, access to the executable cryptographic agent through a Personal Computer/Smart Card (PC/SC) interface of the computer.

17. A computer program product as in claim 16, activating the executable cryptographic agent on the computer includes:

locating, on a memory coupled to the processor, a token seed value; and generating, based on the token seed value, a set of one-time passwords which act as a cryptographic code.

18. A computer program product as in claim 17, wherein deploying the executable cryptographic agent set on the computer includes:

providing a set of inquiries to a user;

receiving a set of enrollment answers from the user in response to the set of inquiries, each enrollment answer from the set of enrollment answers corresponding to an inquiry from the set of inquiries; and storing the sets of inquiries and enrollment answers on the memory;

wherein the sets of inquiries and enrollment answers, in combination with a personal identification number, provide a vehicle for the user to be identified within the computer.

19. A computer program product as in claim 16, wherein activating the executable cryptographic agent on the computer includes:

providing, from the memory, the set of inquiries to a prospective user;

receiving a set of answers from the prospective user in response to the set of inquiries; and comparing the received set of answers to the stored set of enrollment answers.

20. A computer program product as in claim 16, wherein providing access to the executable cryptographic agent through a Personal Computer/Smart Card (PC/SC) interface of the computer includes:

deploying a windowing module in a software layer above that of the PC/SC interface; and providing a subset of data input to and output from the PC/SC interface to a log file stored on the memory;

wherein the windowing module is a dynamically linked library configured to provide an application programming interface for a PKCS11 unit test module to access the cryptographic agent.

* * * * *